United States Patent [19]

Michaelis et al.

[11] Patent Number: 5,241,136
[45] Date of Patent: Aug. 31, 1993

[54] WIRE CABLE ATTACHMENT ADAPTER UNIT

[75] Inventors: Gary P. Michaelis, Oakville; Robert G. Markowski, East Haven; John A. Morby, Farmington, all of Conn.

[73] Assignee: General Electric Company, New York, N.Y.

[21] Appl. No.: 836,695

[22] Filed: Feb. 18, 1992

[51] Int. Cl.⁵ .................. H01B 17/26; H01B 7/00
[52] U.S. Cl. .................. 174/151; 174/65 R; 174/135; 248/74.4; 361/826
[58] Field of Search ............... 174/151, 65 R, 153 G, 174/135, 153 R, 152 G; 361/346, 353, 363, 428; 248/68.1, 74.1, 74.4; 220/4.02, 3.2; 439/469, 472

[56] References Cited

U.S. PATENT DOCUMENTS

| 2,000,851 | 5/1935 | Knell | 220/3.2 |
| 3,717,805 | 2/1973 | Gnaedinger et al. | |
| 3,751,579 | 8/1973 | Nojiri | 174/153 G |
| 4,118,838 | 10/1978 | Schiefer et al. | |
| 4,455,449 | 6/1984 | Rendel | 174/53 |
| 4,591,658 | 5/1986 | Bauer et al. | 174/65 R |
| 4,783,718 | 11/1988 | Raabe et al. | 361/363 |
| 4,922,056 | 5/1990 | Larsson | 174/65 R |

FOREIGN PATENT DOCUMENTS

| 658727 | 3/1963 | Canada . | |
| 2021389 | 2/1990 | Canada . | |
| 2404284 | 8/1975 | Fed. Rep. of Germany | 248/74.4 |
| 0499445 | 4/1972 | U.S.S.R. | 248/74.4 |
| 1350571 | 4/1974 | United Kingdom | 248/74.4 |

Primary Examiner—Lincoln Donovan
Assistant Examiner—Hyung S. Sough
Attorney, Agent, or Firm—Richard A. Menelly

[57] ABSTRACT

A wire cable attachment adapter unit is secured to the top or bottom ends of a circuit breaker or electric switch enclosure to provide strain relief to the electrical power distribution cables that connect with the circuit breakers or switches arranged within the enclosure. The cable support adapter includes a plurality of integrally-formed bulkheads projecting from a support base with upstanding side arms having serrated outer surfaces and separately formed U-shaped clamps having striations formed on the inner legs thereof. The U-shaped clamps are positioned over the side arms to form a cable-receiving channel. After electrical connections are made within the enclosure, the U-shaped clamps are forced against the side arms to fixedly trap the cables within the chamber.

1 Claim, 5 Drawing Sheets

WIRE CABLE ATTACHMENT ADAPTER UNIT

BACKGROUND OF THE INVENTION

Residential load centers in the form of rectangular circuit breaker enclosures electrically connect with the wire conductors within the electrical distribution cables by means of cable access openings formed in the top or bottom ends of the enclosures. Commercial panelboards that house industrial-rated circuit breakers also connect with the electrical power distribution cables by means of openings provided at either end of the enclosures. One such panelboard is described, for example, in U.S. Pat. No. 4,783,718. Once the wire conductors are connected with the circuit breakers within the load center or panelboard enclosures, cable retainer clamps are employed to provide strain relief to the cables. In the absence of the strain relief clamps, longitudinal forces applied to the cables could loosen the connections between the wire conductors and the circuit breakers.

Canadian Patent No. 658,727 describes a spring-like metal clamp arranged on the interior of an electrical outlet box to trap the electrical cable within the box and thereby provide strain relief function. A more recent cable clamp attachment for electrical outlet boxes is found within U.S. Pat. No. 4,591,658 wherein a spring-like plastic clamp in the vicinity of the cable access holes clamps the electrical cables against the side walls of the outlet boxes.

U.S. Pat. No. 4,922,056 describes an electrical box which includes means for securing sheathed cables to the base of the box. In this arrangement, a plurality of clamping jaws are attached to corresponding mounting bases by means of machine screws. The sheathed cables are trapped between the clamping jaws and the mounting bases to provide effective strain relief.

Canadian Patent 2,021,389 describes a means of fastening electrical cables to electrical panelboards employing a removable plastic plug that cooperates with the cable access slot to provide strain relief.

A primary object of this invention is to provide a simple, economic cable clamp adapter which requires no screws for providing strain relief to the cable.

SUMMARY OF THE INVENTION

A compact cable support adapter unit in the form of a unitary, plastic base member having a plurality of bulkheads upstanding from a top surface thereof. The bulkheads include a pair of arms upstanding from a planar base defining an upturned curved center portion and having striations formed on their outer surfaces. A corresponding plurality of U-shaped clamps having striations formed on the inner surface thereof cooperate with the arms to clampingly engage electrical power distribution cables and provide strain relief thereto. A screwdriver or similar tool must be inserted between the U-shaped clamp and the arms to release any of the cables from the cable support adapter.

DESCRIPTION OF THE PREFERRED EMBODIMENT

Figure 1:
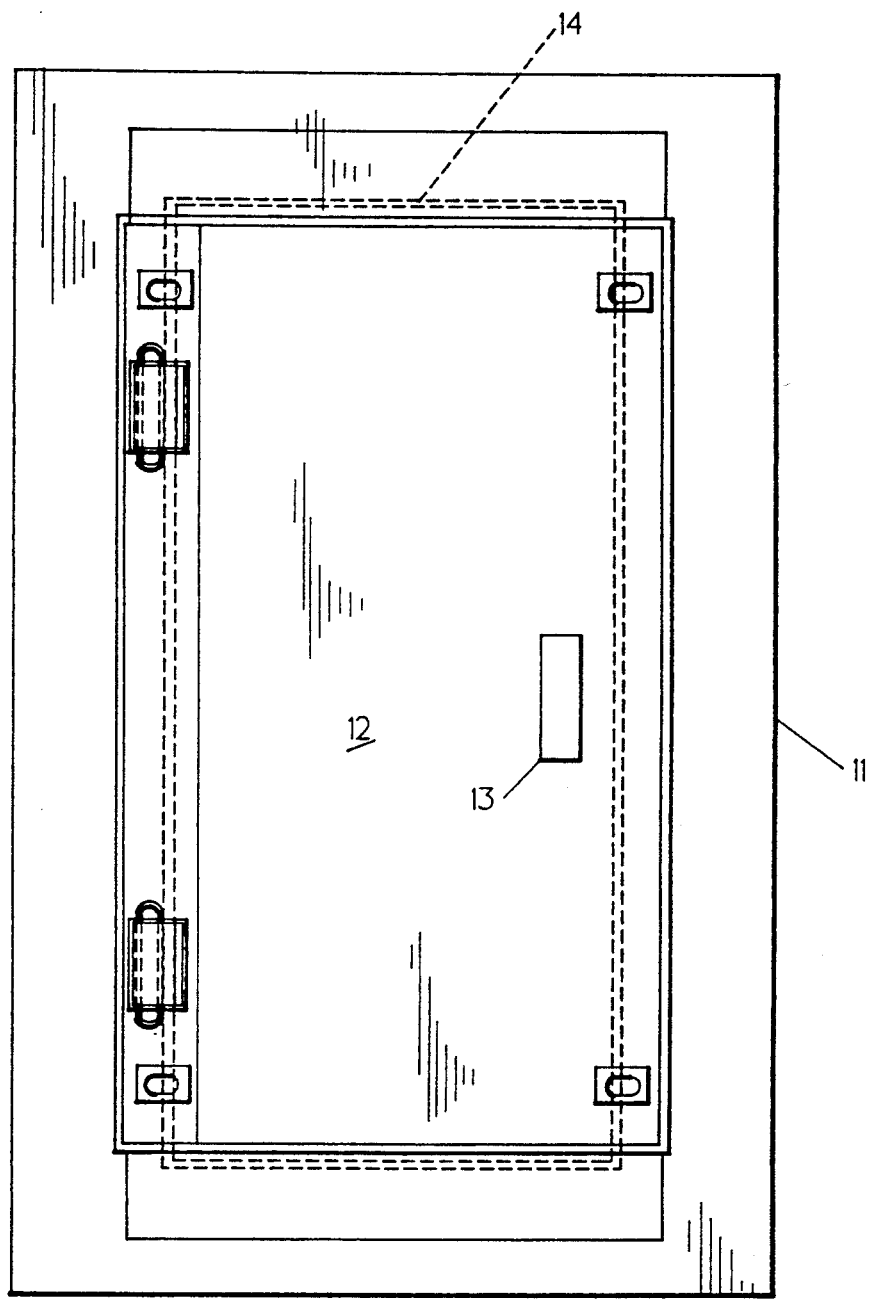
FIG. 1 is a front plan view of an electrical panelboard enclosure which contains the cable support adapter unit in accordance with the invention.

The wire cable attachment adapter of the invention finds use wherever electrical equipment enclosures are electrically connected to electrical power distribution values. One such electrical equipment comprises a panelboard 10 similar to that described in aforementioned U.S. Pat. No. 4,783,718, which is depicted in FIG. 1 to detail the front panel 11 that surrounds and encompasses the outer door 12. Access is made to the dead front 14 behind the door by means of the door handle 13, as indicated.

Figure 2:
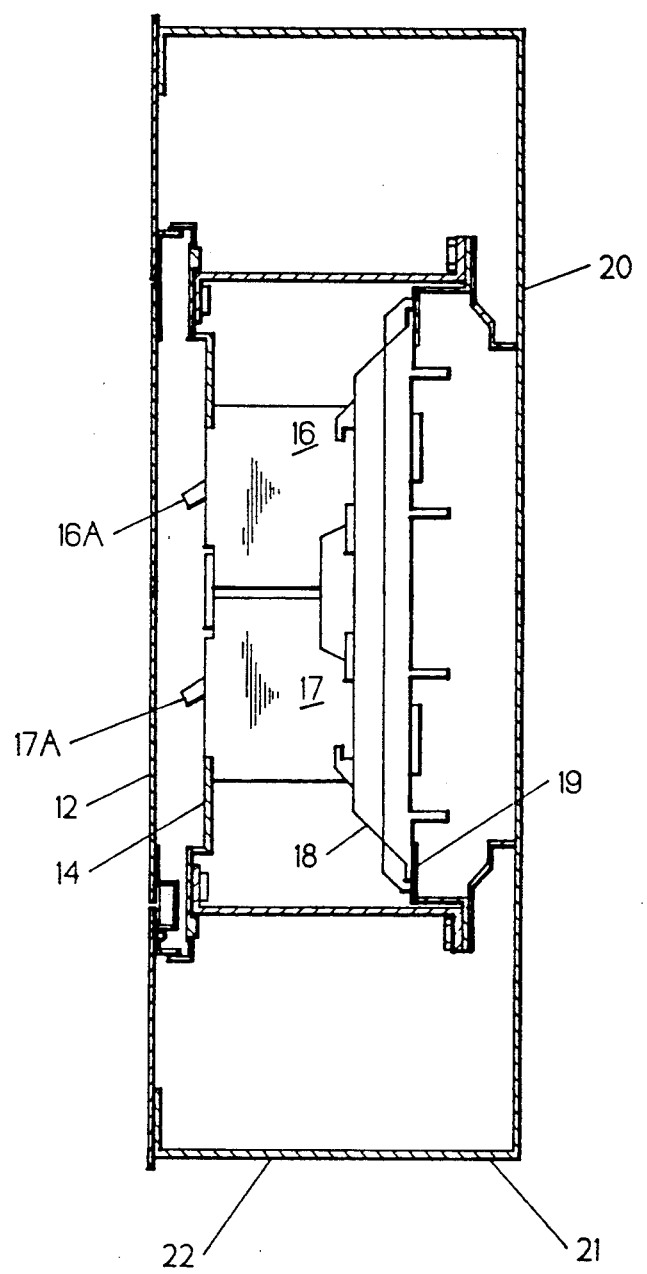
FIG. 2 is a side view of the panelboard of FIG. 1, in partial section prior to the attachment of the cable support adapter unit.

As best seen by referring now to the panelboard 10 shown in FIG. 2 a plurality of circuit breakers 16, 17 are mounted on a plastic saddle 18 by means of a metallic base support 19 that is spaced apart from the rear wall 20 or mounted directly on the bottom wall 21. Access to the circuit breakers for turning the circuit breakers between their ON and OFF conditions is made by means of corresponding circuit breaker operating handles 16A, 17A that extend through openings within the dead front 14. Although not shown, electric power distribution cables pass into the panelboard by means of the knock-outs 22 formed on the bottom wall 21. Since the electric power distribution cables pass out from the panelboard to various electrical equipment connected with the circuit breakers, "strain relief" clamps (not shown) are used to clamp the electric power distribution cables to the bottom wall to prevent disconnection between the ends of the cables and the circuit breakers in the event that external force is applied to the electric power distribution cables during and subsequent to the installation of the associated electrical equipment.

In accordance with the teachings of the invention, a molded plastic cable support adapter unit 24, hereafter "adapter" which includes a unitary base 25 attached to the bottom wall 21 of the panelboard 10 by means of machine screws 28, thru holes 27 formed in the extensions 26 on the wall base and threaded openings 29 formed in the bottom wall. The adapter is positioned within a rectangular opening 23 formed in the bottom wall and is positioned such that the peripheral lip 30 extending from the base tightly fits within the confines of the rectangular plate. A plurality of knock-outs 31 formed within the base allow for passage of the electrical distribution cables through the adapter 24 within the panelboard 10. A corresponding plurality of bulkheads 32 surround each of the respective knock-outs. Each bulkhead consists of a pair of opposing side extensions 33, 34 upstanding from and integrally-formed with the base 25. An arcuate center extension 35 supports the electric power distribution cable in a manner to be described below in greater detail. Striations 47 are formed on the outer surface of the opposing side extensions to fixedly retain the U-shaped clamp 36 that joins with the opposing side extensions to form the completed bulkhead. The U-shaped clamp includes a pair of legs 37, 38 that have striations 39 formed on their inner surfaces. A pedestal 41 upstanding from the bight defined by the U-shaped clamp intermediate the legs 37, 38 includes a plurality of striations 42 to fixedly hold the electric power distribution cable against the arcuate center portion 35 defined between the opposing side extensions 33, 34 when the U-shaped clamp 36 is positioned on the closing side extensions to form the bulkhead 32. It is noted that the striations 39 formed on the inner surfaces of the legs interact with the corresponding striations 47 formed on the outer surfaces of the opposing side extensions to prevent the legs 37 from moving away from the side extensions. The bottom wall 21 includes a plurality of supplemental knock-outs as indicated at 22 to provide for access to various size electrical distribution cables, as indicated.

Figure 3:
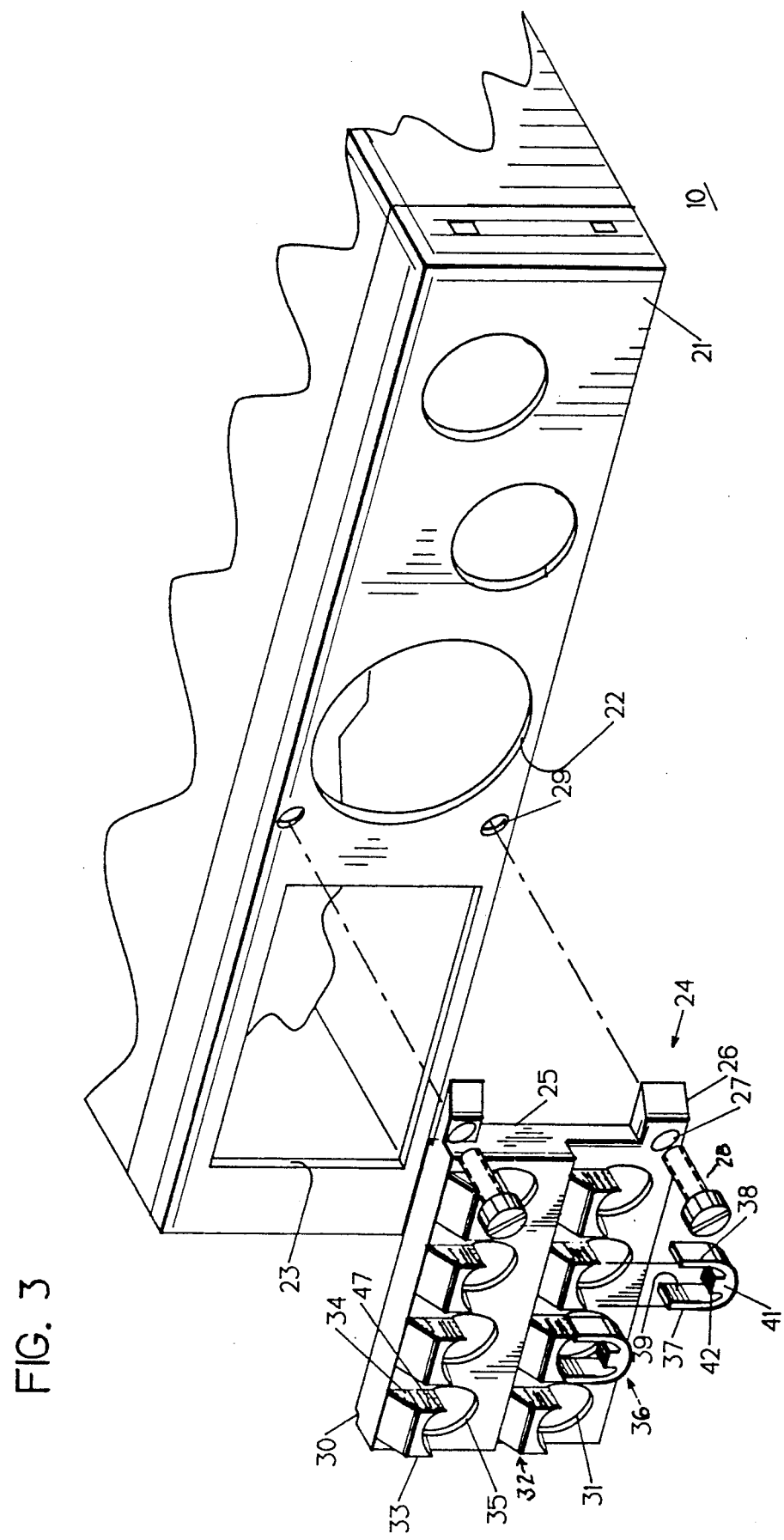
FIG. 3 is an enlarged bottom perspective view of the panelboard enclosure of FIG. 1 prior to attachment of the cable support adapter unit.
Figure 4:
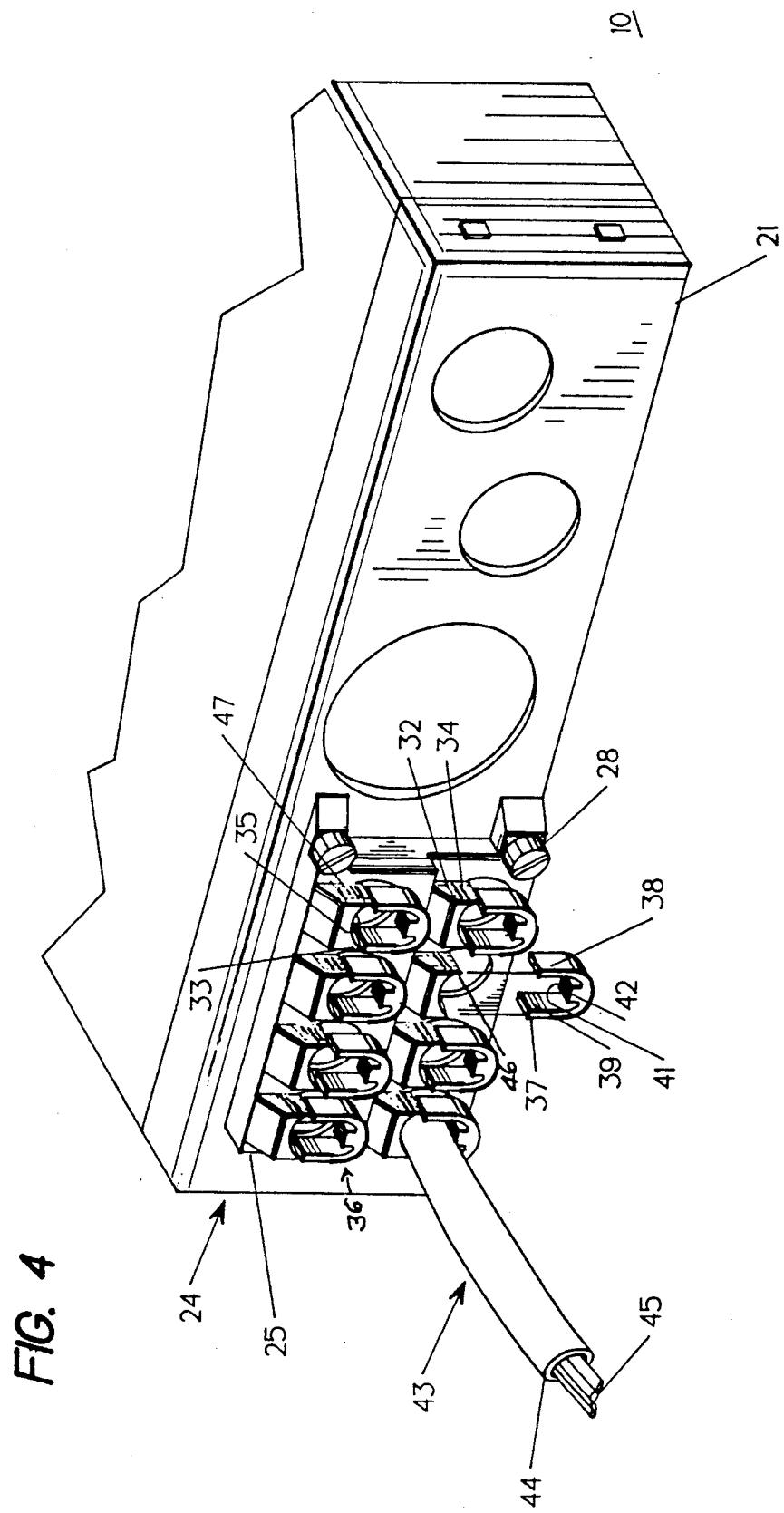
FIG. 4 is a bottom perspective view of the panelboard enclosure of FIG. 3 with the cable support adapter unit attached and containing electrical power distribution cables in a clamped configuration.

The bottom wall 21 of the panelboard 10 is shown in FIG. 4 with the adapter 24 attached to the bottom wall and with a plurality of cables 43 secured to the adapter in a stress-free relation. Each of the electrical distribution cables comprises a plurality of wire conductors 45 contained within an insulative sheet as indicated at 44. The cables 43 are inserted within the openings 46 through the base 25 of the adapter formed by removal of the associated knock-outs 31 depicted earlier in FIG. 3. The bulkhead 32 consisting of the opposing side extensions 33, 34 is depicted prior to assembly of the U-shaped clamp 36 to the side extensions to indicate the entrapment of the cables 43 between the arcuate center portion 35 on the pedestal 41 when the legs 37, 38 are positioned over the cable and the opposing side sections 33, 34 whereby the striations 39 on the inner surfaces of the legs engage the striations 47 formed on the legs and the striations 42 formed on the top surface of the pedestal engages the electric power delivery cable 43.

Figure 5:
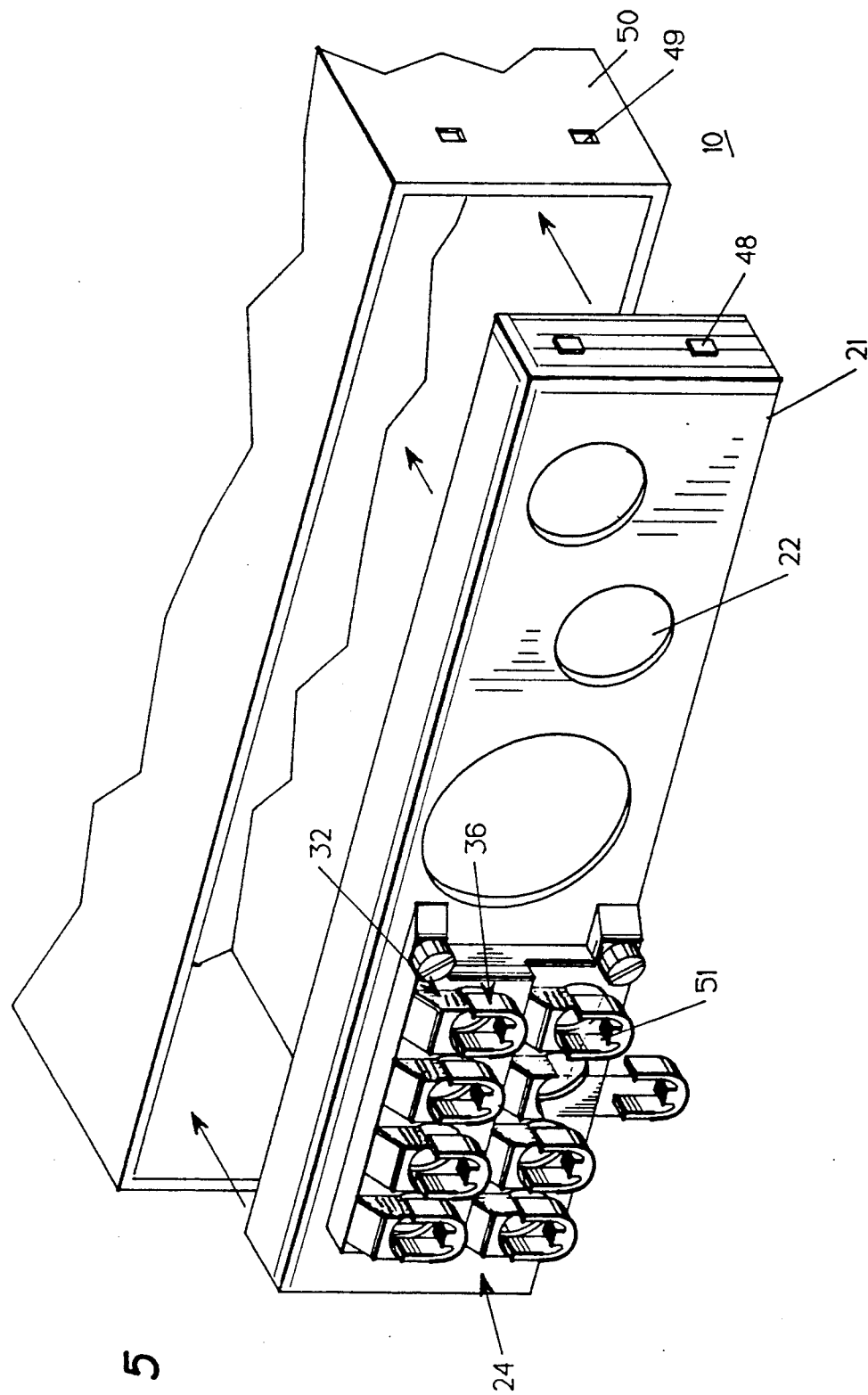
FIG. 5 is a bottom perspective view of the panelboard enclosure of FIG. 1 having the cable support adapter unit integrally-formed at the bottom thereof.

In the electric panelboard 10 depicted in FIG. 5, the adapter 24 is integrally-formed with and becomes part of the bottom wall 21, all formed of a thermal plastic material. The bulkheads 32 are shown with the U-shaped clamp 36 attached to thereby define the cable-receiving opening 51 defined therein similar to the knock-outs 22 formed on the bottom wall. The bottom wall is secured to the side walls 50 of the panelboard by the engagement between the projections 48 on the edges of the bottom wall and the corresponding rectangular openings 49 formed on the edges of the side walls 50.

An electrical power distribution cable retainer in the form of a unitary adapter unit having a plurality of removable U-shaped clamps has herein been described. The clamps fixedly retain the electric power distribution cables within the adapter unit to provide strain relief to electrical equipment contained within an electrical equipment enclosure. The U-shaped clamp can only be displaced from the cable by means of a screwdriver or similar tool because of the friction relationship between the striations on the inner surfaces of the U-shaped clamp and the corresponding striations formed on the outside surfaces of the legs integrally-formed with the adapter base.

Having thus described our invention, what we claim as new and desire to secure by Letters Patent is:

1. An electric cable strain relief adapter comprising:
    a unitary insulative base including a pair of apertured extensions on one end thereof to facilitate attachment to an electrical enclosure;
    a plurality of knock-outs formed in said base and adapted to provide clearance for a corresponding plurality of electric cables;
    a corresponding plurality of bulkheads integrally-formed on said base and extending in registry with said knock-outs, each of said bulkheads comprising a pair of opposing side extensions defining a radial surface therebetween, each of said extensions including a plurality of first striations formed on their outer surfaces; and
    a corresponding plurality of U-shaped clamps adjustably positioned on said bulkheads and arranged for trapping electric cables between said U-shaped clamps and said bulkheads, each of said U-shaped clamps comprising a pair of leg extensions having a plurality of second striations formed on their inner surfaces.

* * * * *